(12) United States Patent  (10) Patent No.: US 8,004,999 B2
Voss  (45) Date of Patent: Aug. 23, 2011

(54) METHOD AND APPARATUS FOR DEPICTING THROUGHPUT ON TCP AND RLC LAYER OF UMTS SYSTEM

(75) Inventor: Juergen Voss, Wiesbaden (DE)

(73) Assignee: JDS Uniphase Corporation, Milpitas, CA (US)

( * ) Notice: Subject to any disclaimer, the term of this patent is extended or adjusted under 35 U.S.C. 154(b) by 1570 days.

(21) Appl. No.: 11/116,859

(22) Filed: Apr. 28, 2005

(65) Prior Publication Data

US 2006/0245353 A1 Nov. 2, 2006

(51) Int. Cl.
*H04L 12/26* (2006.01)
(52) U.S. Cl. .................... 370/251; 370/496; 709/224
(58) Field of Classification Search .............. 370/230, 370/232, 241, 252, 392
See application file for complete search history.

(56) References Cited

U.S. PATENT DOCUMENTS

| 5,867,483 | A | * | 2/1999 | Ennis et al. | 370/252 |
| 6,219,050 | B1 | * | 4/2001 | Schaffer | 715/853 |
| 6,745,351 | B1 | * | 6/2004 | Mastro | 714/57 |
| 2002/0159444 | A1 | * | 10/2002 | Vialen et al. | 370/352 |
| 2006/0146833 | A1 | * | 7/2006 | Roberts et al. | 370/395.42 |
| 2006/0153232 | A1 | * | 7/2006 | Shvodian | 370/468 |
| 2007/0291757 | A1 | * | 12/2007 | Dobson et al. | 370/392 |

* cited by examiner

*Primary Examiner* — Seema S. Rao
*Assistant Examiner* — Henry Baron
(74) *Attorney, Agent, or Firm* — Volentine & Whitt, PLLC

(57) ABSTRACT

A method of creating a graphical display illustrating throughput of data across a protocol layer. A first graphical indication is displayed which illustrates of the number of data units received, by a protocol layer, for each of a plurality of transmission intervals. A second graphical indication is displayed which illustrated the number of data units output by the protocol layer for each of a plurality of transmission intervals.

11 Claims, 5 Drawing Sheets

METHOD AND APPARATUS FOR DEPICTING THROUGHPUT ON TCP AND RLC LAYER OF UMTS SYSTEM

BACKGROUND OF THE INVENTION

Third-generation wireless communication systems (generally referred to as 3G systems) are currently being designed, built and placed into operation. 3G systems are typically defined by broadband packet-based transmission of data, including: text; voice; video; and multimedia, at data rates up to and possibly higher than 2 megabits per second (Mbps). One example of a 3G system is the Universal Mobile Telecommunications System (UMTS).

UMTS is an evolving system being developed within the International Telecommunications Union (ITU) IMT-2000 framework. UMTS was generally conceived to be a follow on network to the group special mobile (GSM) network that dominate Europe. UMTS employs a 5 MHz channel carrier width to deliver significantly higher data rates and increased capacity compared with second-generation networks. This 5 MHz channel carrier provides optimum use of radio resources, especially for operators who have been granted large, contiguous blocks of spectrum—typically ranging from 2×10 MHz up to 2×20 MHz—to reduce the cost of deploying 3G networks. Universally standardized via the Third Generation Partnership Project (3GPP—see www.3gpp.org) and using globally harmonized spectrum in paired and unpaired bands, 3G/UMTS in its initial phase offers theoretical bit rates of up to 384 kbps in high mobility situations, rising as high as 2 Mbps in stationary/nomadic user environments. Symmetry between uplink and downlink data rates when using paired (FDD) spectrum also means that 3G/UMTS is ideally suited for applications such as real-time video telephony.

3G systems, such as UMTS, generally have three constituent parts: a personal communication device, a radio access network and a core network. The personal communication device (termed user equipment(UE) in UMTS) generally comprises a cell phone or other personal communication device. The radio network generally comprises a base station (termed a node-B in UMTS) and a controller (termed a radio network controller (RNC) in UMTS). The base station forms a communication path with the user equipment under the direction of the controller. The controller in turn communicates with the core network. The core network performs switching, billing and data service functions. Once of the key features of 3G networks is the provision of packet data and associated services including traditional TCP/IP services like e-mail, http, and FTP. Future iterations of 3G systems, including UMTS, may even transfer voice data via packets using voice over IP (VOIP) technology.

Test and measurement systems are available for monitoring and trouble-shooting various connections and devices in emerging 3G systems. One area of interest is throughput of data from the core network to the user equipment, and in particular the throughput of packet data. Of particular interest is transmission control protocol (TCP) layer data as passed through the RLC and MAC layers. An understanding of throughput across multiple layers would assists users in determining the health of the network and identifying problems with the network. The present inventors have recognized a need for enhanced display apparatus and methodologies that provides information regarding the throughput of data on various layers of a 3G network in a manner easily understood by a user.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1:
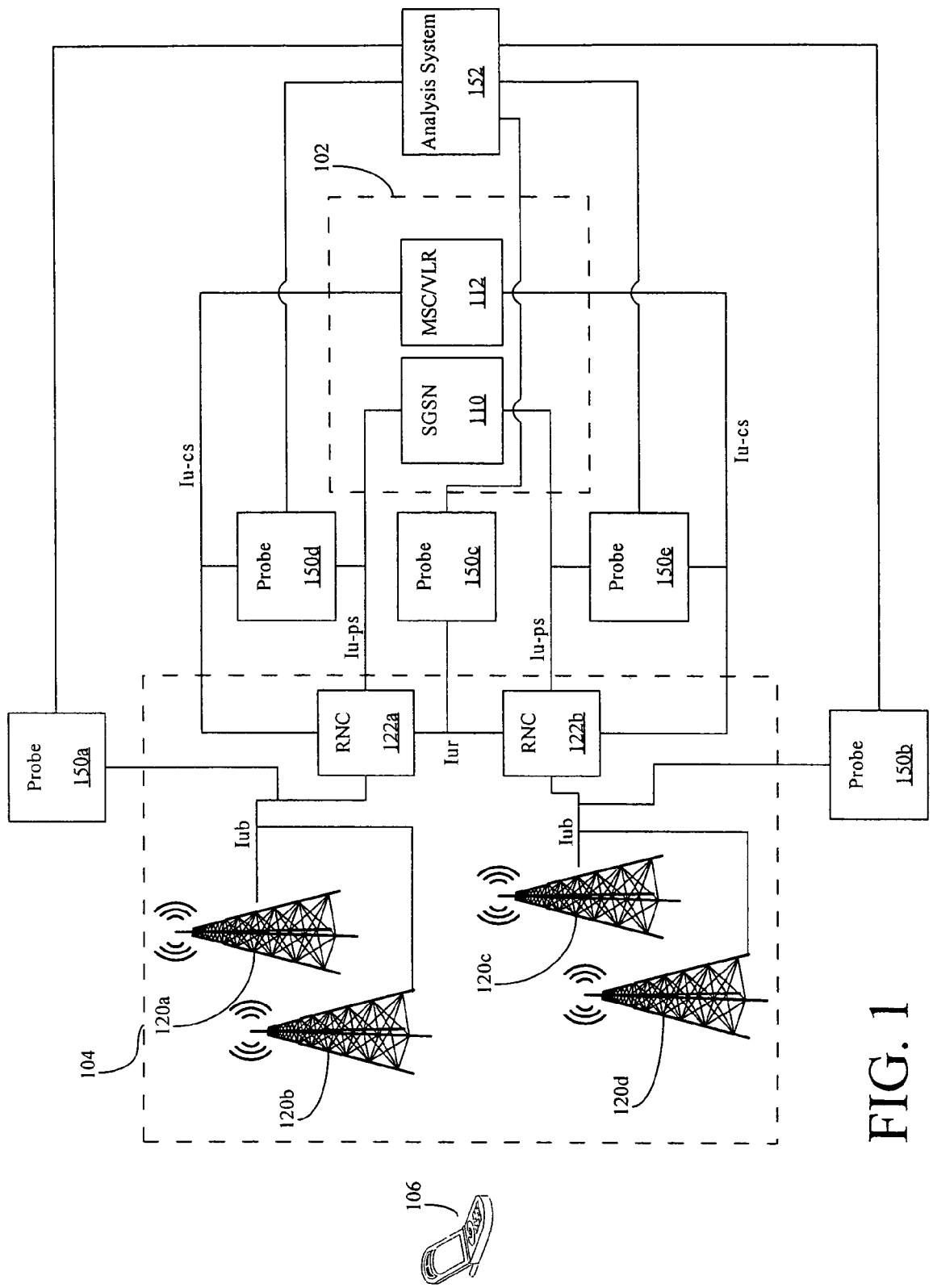
FIG. 1 is a block diagram of a network analysis system upon which methods in accordance with a preferred embodiment of the present invention may be practiced.

Reference will now be made in detail to the present invention, examples of which are illustrated in the accompanying drawings, wherein like reference numerals refer to like elements throughout. The detailed description which follows presents methods that may be embodied by routines and symbolic representations of operations of data bits within a computer readable medium, associated processors, general purpose personal computers and the like. These descriptions and representations are the means used by those skilled in the art effectively convey the substance of their work to others skilled in the art.

A method is here, and generally, conceived to be a sequence of steps or actions leading to a desired result, and as such, encompasses such terms of art as "routine," "program," "objects," "functions," "subroutines," and "procedures." The methods recited herein may operate on a general purpose computer or other network device selectively activated or reconfigured by a routine stored in the computer and interface with the necessary signal processing capabilities. More to the point, the methods presented herein are not inherently related to any particular device; rather, various devices may be used to implement the claimed methods. Machines useful for implementation of the present invention include those manufactured by such companies as AGILENT TECHNOLOGIES, INC. and HEWLETT PACKARD, as well as other manufacturers of computer and network equipment.

With respect to the software described herein, those of ordinary skill in the art will recognize that there exist a variety of platforms and programming languages for creating software for performing the methods outlined herein. Embodiments of the present invention can be implemented using any of a number of varieties of programming languages, JAVA being one example, however, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a microprocessor, but can also be implemented in other types of processors. For example, the methods could be implemented with HDL (Hardware Design Language) in an ASIC (application specific integrated circuits). In addition, the solution may be implemented in a single computer or could span multiple computers with each performing a subset of the tasks.

The following description will use nomenclature associated with a UMTS system, however those of ordinary skill in the art will recognize that the present invention is applicable to any wireless system that transmits packetized data, including any 3G system, most 2.5G systems and many 1G systems. It is anticipated that most future systems would benefit from the present invention, including the embodiments thereof described herein.

FIG. 1 is a block diagram of a network analysis system upon which methods in accordance with a preferred embodiment of the present invention may be practiced. More specifically, FIG. 1 illustrates the AGILENT TECHNOLOGIES' SIGNALING ANALYZER family of products as applied to a UMTS network. The UMTS network generally comprises s Core Network (CN) 102, a UMTS Terrestrial Radio Access Network (UTRAN) 104 and User Equipment (UE) 106. The main function of the CN 102 is to provide switching, routing and transit for user traffic that may includes voice, video, and data. The CN 102 also contains hardware and software for managing databases and performing network management functions. The UTRAN 104 provides the air interface access method for UE 106. The UE 106 generally comprises a cell phone or other personal communication device. In the configuration shown in FIG. 1, the CN 102 generally comprises: one or more serving GPRS support nodes (SGSN) 110 and one or more mobile switching centers (MSC) 112. The UTRAN 104 generally comprises one or more base stations 120n (referred as Node-Bs) and one or more radio network controllers 122n (RNC).

The connections among and between the various constituent parts of a UMTS network are facilitated by interfaces. For example, the air interface between the node Bs 120n and the user equipment 106 is referred to as a Uu interface and generally conforms to the WCDMA air interface. Similarly, communication between node Bs 120n and the RNCs 122n are facilitated by Iub interfaces. Unlike GSM, UMTS specifies an interface between RNCs 112n, termed the Iur interface. The interface between the RNCs 122n and the core network are generally termed an Iu interface. In at least the first iteration of the UMTS standard, separate Iu interfaces for circuit switched and packet switched connections are used, termed Iu-cs and Iu-ps respectively. At least in the initial versions of UMTS, each of the cited interfaces are based on asynchronous transfer mode (ATM) technology.

Probes 150n, such as the Agilent Distributed Network Analyzer, monitor messages sent within the UMTS 100. The connections illustrated in FIG. 1 for the probes 150n are logical, it being recognized that the physical connections may follow a different topology. Generally, the probes 150n passively and actively measure and gather messages passed over the various interfaces, such as the IUB, IU, and IUR links. Thus, the probe 150a monitors the Iub interface between the RNC 122a and the node-Bs 120a and 120b. The probe 150b monitors the Iub interface between the RNC 122b and the node-Bs 120c and 120d. The probe 150c monitors the Iur interface between the RNC 122a and the RNC 122b. Lastly the probes 150d and 150e monitor the Iu interfaces between the RNCs 122a and 122b, respectively, with the core network 102. An analysis system 152 receives messages from the probes 150n, analyzes the messages and provides information related to the operation of the UMTS system 100. The analysis system 152 may, for example, comprise an AGILENT SIGNALING ANALYZER modified in accordance with the teaching of the present invention. The analysis system 152 creates a variety of measurements describing the signals being monitored. Such measurements generally comprise data and context. The context may be a time stamp with an identification of the analyzer producing the measurement. The data may comprise raw data captured from the network under test.

The AGILENT TECHNOLOGIES' SIGNALING ANALYZER provides a distributed testing and analysis solution that maximizes the time and resources devoted to planning, troubleshooting, installing, and maintaining modern day networks. The modular design and flexibility of Signaling Analyzer solutions allows technology teams to identify potential problems and resolve faults quickly and effectively—with product configurations to exactly match engineers' differing needs. In particular, the Signaling Analyzer—Realtime (J7326A) enables key personnel to see network problems as they occur and turns what can be an overwhelming amount of diagnostic data into usable information. For maximum interface flexibility, the Signaling Analyzer—Realtime uses the same well-proven J6801A data acquisition module with hot-swappable Line Interfaces as Agilent's other distributed network analysis solutions. Alternatively, the Signaling Analyzer—Software Edition (J5486B) can be used off-line for post-capture analysis. Those of ordinary skill in the art will recognize that the Agilent Signaling family of product is but one probe/analyzer solution with which the present invention may be practiced. Further, while a distributed system may simplify many of the problem surrounding the installation and use of a measurement system, the present invention may be practiced on non-distributed system, including those offered by such vendors as Tektronix Inc.

Figure 2:
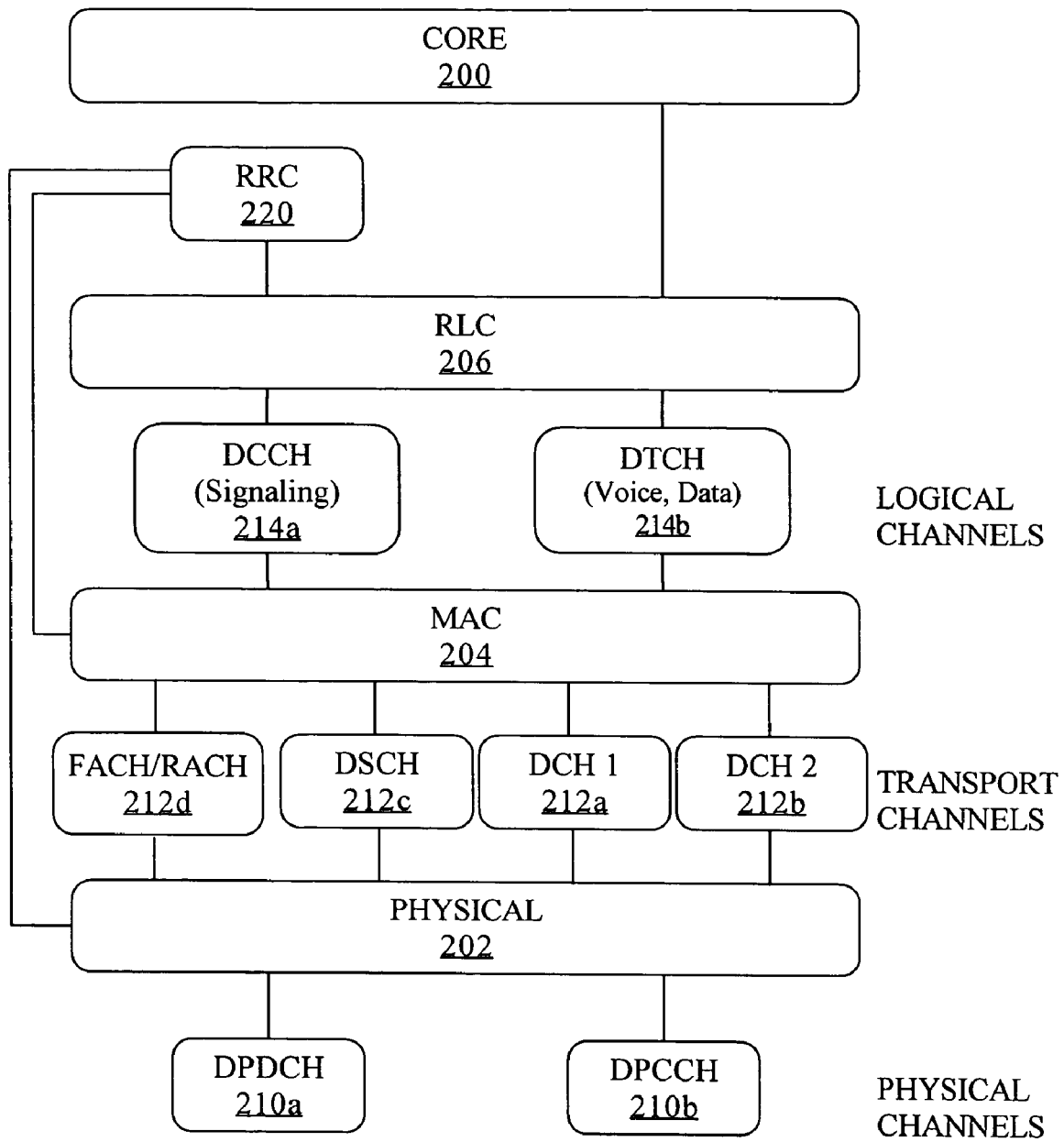
FIG. 2 is a block diagram useful for explaining the present invention

FIG. 2 is a block diagram useful for explaining the present invention. Communication between elements of a UMTS network is facilitated using layers, generally in conformance with the OSI model. FIG. 2 illustrates mapping of data to radio channels for transmission over the Uu interface. The physical layer 202 resides at the lowest level. A medium Access Control (MAC) layer 204 sits atop the physical layer 202 while a radio link control (RLC) layer 206 sits atop the MAC layer 204. The MAC 204 and RLC 206 are generally considered as sub-layers of the data link layer in the OSI model.

Communication of data and control messages across each of the interfaces is performed pursuant to defined protocols based on the OSI seven layer model. Thus, the bottom layer, i.e. the physical layer 202, handles the transmission of data. The second layer, termed the data link layer, contains four sub-layers including: the MAC 204; the RLC 206; the packet data convergence protocol (PDCP) (not shown) and the Broadcast/Multicast Control (BMC) (also not shown). The PDCP and BMC are only used in the user plane.

The RLC 206 receives data in the form of service data units (SDUs) from higher levels via service access points (SAPs) and creates uniform protocol data units (PDUs) and transmits the PDUs to the MAC layer 204. The RLC 206 supports the following functions: segmentation and reassembly; concatenation; padding; transfer of user data; error correction; in-sequence delivery of higher layer PDUs; duplicate detection; flow control; sequence number check; protocol error detection and recovery; ciphering; suspend/resume function. RLC messages are transmitted to the MAC using as PDUs over logical channels 214n. A set of logical channel types is defined for different kinds of data transfer services as offered by MAC 204. In other words, the type of information being transferred defines which type of logical channel is used. Examples of logical channels are illustrated in FIG. 2 and include: dedicated control channel (DCCH) 214a; and dedicated traffic channels (DTCH) 214b. Multiple logical instances of each type of channel may be present. For example, there are typically four (4) DCCH logical channels at any given time. It is also to be noted that separate instances of RLCs are provided for each logical channel 214n. As noted the RLC 206 performs segmentation on received data. The terms segmentation, concatenation and padding generally refer to processes whereby the RLC 206 creates fixed length PDUs out of variable length upper layer PDUs. In general, the throughput of data through the RLC layer 206 can be understood by comparing a maximum number of PDUs that could be transmitted with the number of PDUs actually transmitted.

The MAC 204 provides data transfer services for data received on logical channels 214n. In general, the MAC layer prioritizes the received data and transfers it to the physical layer 202 via transport channels 212n. Examples of transport channels 212n in FIG. 2 include: dedicated transport channels (DCH) of which two are shown (212a and 212b); Downlink Shared Channels (DSCH) 212c; and Common Channels 212d (example of which include: Forward Access Channel (FACH) and Random Access Channel (RACH)). The MAC layer 204 routes the logical channels to the transport channels ... hence the name Medium Access Channel. The MAC 204 also prioritizes the placing of data onto the transport channels 212n.

Please note that the RNC 122 can decide, depending on the throughput, which transport channel is utilized. The RNC 122 also can change the radio channel configuration during a call e.g. if the user does not request any data transmission, the RNC 122 may move the active call from a Dedicated Channel (DCH) to a Common Channel (FACH/RACH) to release the unused radio resources.

The functions of the physical layer 202 include: RF processing; spreading; scrambling and modulation; coding and decoding for support of forward error correction; power consumption; timing advance; and soft handover execution. The physical layer outputs data onto physical channels 210n. Examples of physical channels in FIG. 2 include: a dedicated physical data channel (DPDCH) 210a; and a dedicated physical control channel (DPCCH) 210b. Other examples, not shown, include: a Primary Common Control Physical Channel (P-CCPCH); and a Secondary Common Control Physical Channel (S-CCPCH).

A radio resource control (RRC) 220 provides a variety of control functions, including: configuration of the MAC 204 and RLC 206; request for traffic volume measurements from RRC 206; controlling a transmission time interval (TTI) of the transport channels 212n; controlling packet data size on the transport channels 212n; and governing data specific parameters in RLC 206 and MAC 204.

In general, the throughput of a UMTS system can be understood by comparing a maximum number of RLC PDUs that could be transmitted with the number of RLC PDUs actually transmitted. Further understanding can be obtained by reference to higher-level PDUs sent to the RLC 204 for transmission. Probes, such as the Agilent DNA series of probes, may be configured to monitor PDUs entering and exiting the RLC. Based on such monitoring, analysis software, such as the Agilent Signaling Analyzer, may be configured to generate graphical displays illustrating the movement of PDUs through the RLC.

Figure 3A:
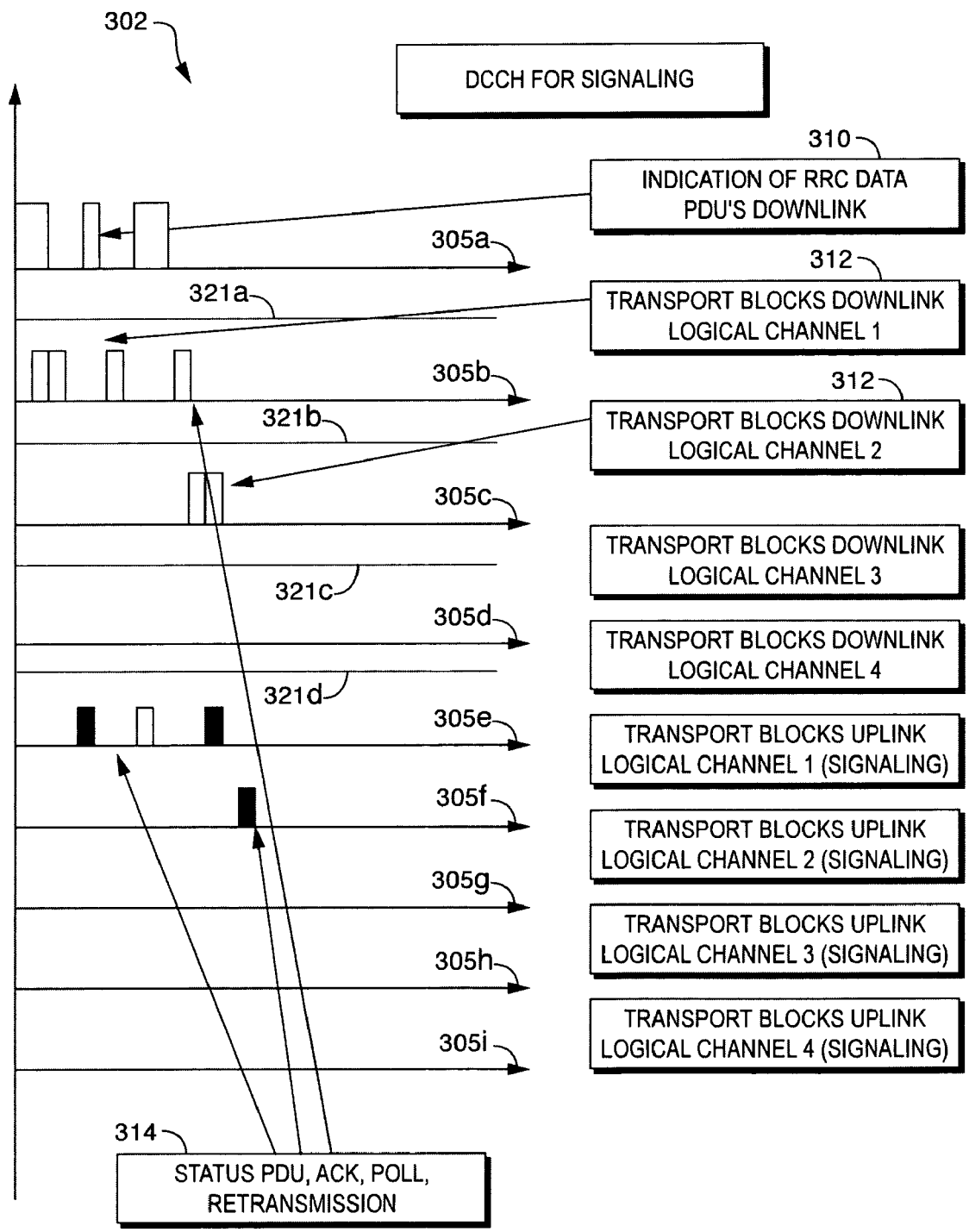
FIGS. 3a and 3b are illustrations of a graphical display formulated in accordance with an embodiment of the present invention.
Figure 3B:
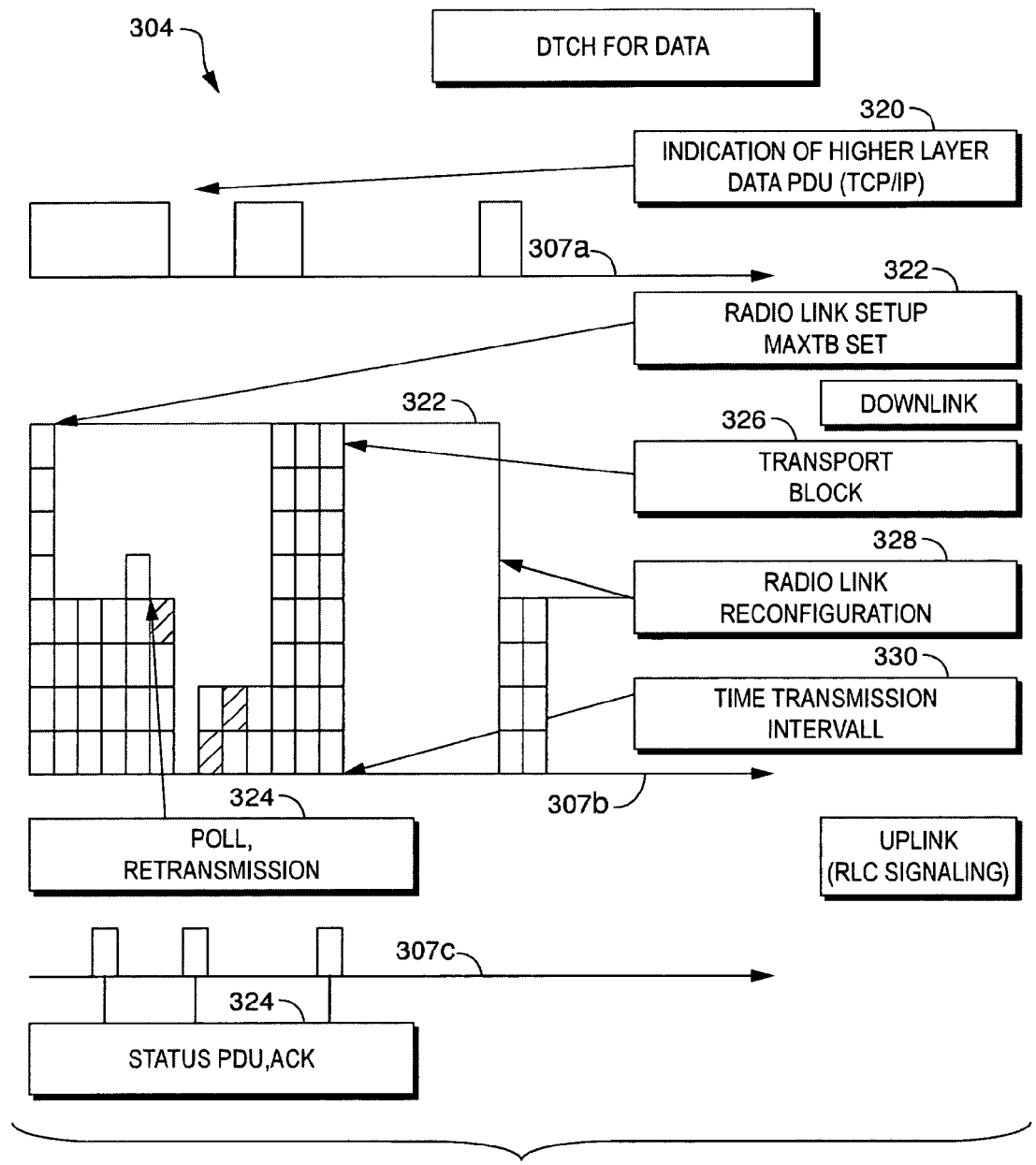

FIGS. 3a and 3b are illustrations of a graphical display formulated in accordance with an embodiment of the present invention. The graphical display is generally divided into two sections: a first section 302, illustrated in FIG. 3a, for a graphical display related to the transmission of signaling information; and a second section 304, illustrated in FIG. 3b, for a graphical display related to the transmission of data, such as voice and TCP/IP data. In each case, the graphical display compares the relative timing of incoming data and outgoing PDUs. In the examples shown in FIG. 3a and FIG. 3b, the top most graph illustrates PDUs are coming into an RLC layer from either the RRC or core; while the lower graphs illustrates data sent and received from logical channels.

Referring to FIG. 3a, the first timeline 305a displays blocks 310 representing incoming PDUs from an RRC (generally representing signaling information). Basically, for each time transmission interval during which an RRC PDU is received, a block is generated. As the incoming data has not been segmented, the block may span multiple time transmission intervals. The second through fifth (line 305b through 305e) display blocks 312 representing PDUs output onto one of four logical channels, e.g. downlink DCCH channels. The sixth through ninth (line 305f through 305i) display blocks 312 representing PDUs received onto one of four logical channels, e.g. uplink DCCH channels. Certain of the blocks, e.g. blocks 314, are colored to indicate reception and/or transmission of PDUs containing messages related to the transmission of such blocks, including, for example, status PDUs, ACK, POLL, and retransmission requests.

Referring to FIG. 3b, the first timeline 307a displays blocks 310 representing incoming PDUs from the core (generally representing data). Basically, for each time transmission interval during which a data PDU is received, a block is generated. As in FIG. 3a, the incoming data has not been segmented such that the block may span multiple time transmission intervals. The second time line 307b, displays blocks 326 representing PDUs output on to a logical channel, e.g. a DTCH channel. Finally, the third time line 307c displays blocks 326 representing PDUs received onto a DTCH channel. As in FIG. 3a, certain of the blocks, e.g. block 324, are colored to indicate reception and/or transmission of PDUs containing messages related to the transmission of such blocks, including, for example status PDUs, ACK, POLL, and retransmission requests.

Depending on the configuration parameters, generally set by the RRC 220, the number of RLC PDUs that can be transmitted per time transmission interval (TTI) may vary. This is typically setup via a radio link setup or a radio link reconfiguration process. To communicate the maximum number of blocks that may be transmitted, indications 321n and 322 may be applied to the downlink timelines—lines 305b-305e and 307b, respectively. Generally, one signaling PDU may be transmitted per TTI. The number of data PDUs that can be transmitted will vary based on a variety of parameters, not the least of which is the type of data being transmitted. In the example shown in FIG. 3b, two levels are illustrated: eight PDUs and four PDUs. Looking at point 328, the indication 322 shifts to illustrate the drop from a maximum of eight data PDUs to a maximum of four data PDUs. In this case, the RNC did a Radio Link Reconfiguration because the user did not use the network resource for a predefine time frame starting at the TTI 330. In this case the RNC reconfigured the Radio Interface, which has influence on the maximum send Transport Blocks per TTI (it can make the DCH smaller or move to the FACH).

Figure 4:
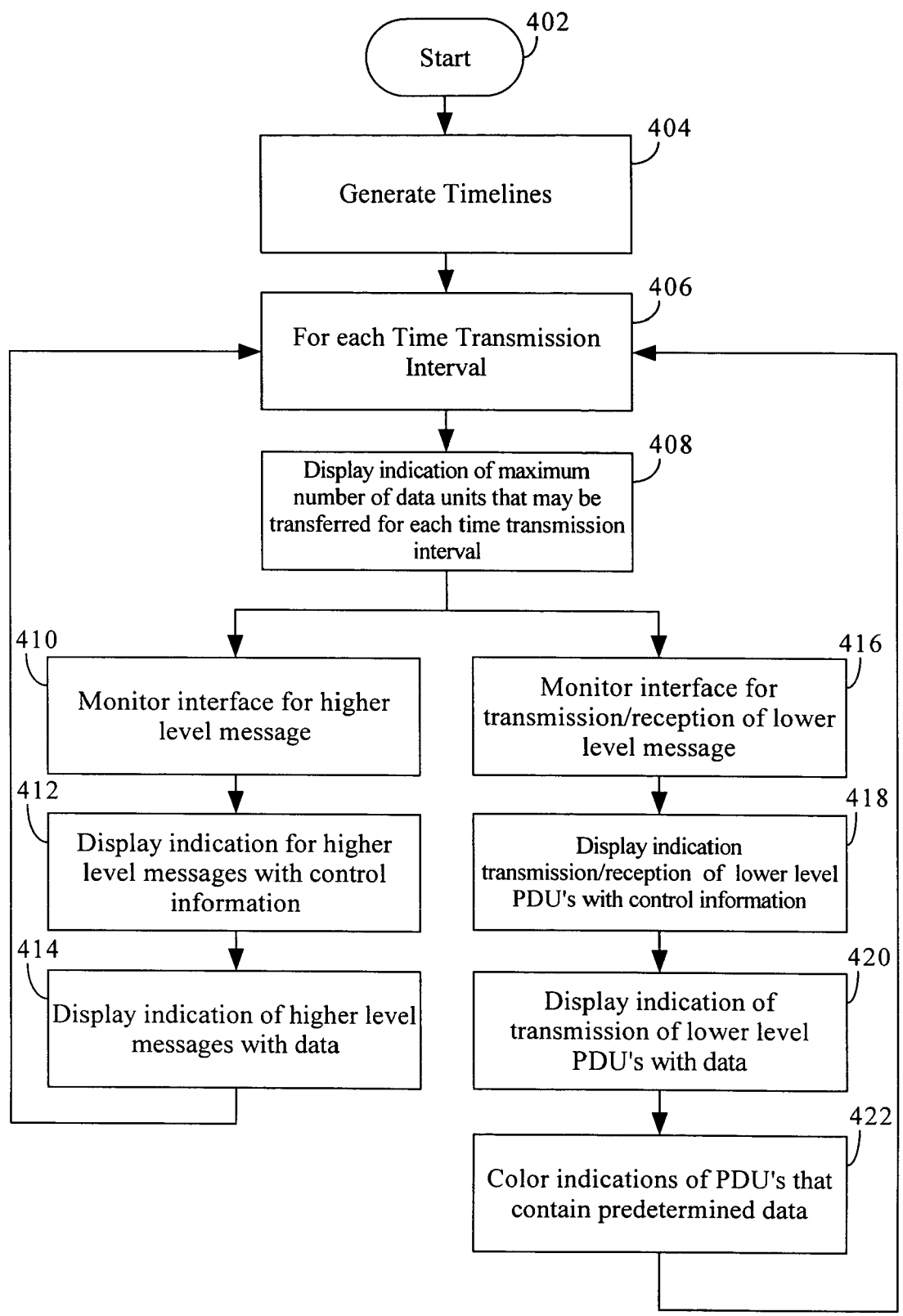
FIG. 4 is a flow chart of a method in accordance with an embodiment of the present invention.

FIG. 4 is a flow chart of a method in accordance with an embodiment of the present invention. In general, the method described in FIG. 4 generates a display that illustrates throughput of data while allowing a comparison of higher level protocol message input with lower level protocol message output. It may prove preferable to generate separate displays for transmission and receiving. For example, the display shown in FIG. 3a and FIG. 3b integrate transmission and reception. Further, in each case, higher-level PDUs are those that are received by the RLC, while lower level PDUs are those outputted by the RLC. It is to be recognized that this is but one example of higher and lower levels and that the present embodiment applies to any relative higher and lower message units in accordance with the OSI model or other applicable model.

The method starts in step 402. In step 404, timelines are generated. In general, at least two timelines should be generated: one for received data; and one for output data. The received data will generally comprise higher-level protocol messages while the output data will generally comprise lower level protocol messages. Higher and lower are, of course, relative to each other. While the example in FIG. 2, portrayed PDUs into and out of an RLC, the present invention is not limited thereto.

The next step, step 406, sets up a loop to be performed for each time transmission interval. In step 408, an indication of the maximum number of lower level protocol messages that may be transmitted is displayed. This is an optional but potentially valuable step. Thereafter, the method splits with one branch focusing on the upper layer messages received and the other branch focusing on the lower layer messages transmitted.

Describing the processing of the higher-level messages first, the method proceeds to step 410 wherein the various interfaces are monitored for the presence of higher-level messages. In general, the term higher-level messages will refer to a specified level, for example, messages received by an RLC. The monitoring may be performed by hardware or software and may comprise, for example, AGILENT'S SIGNAL ANALYZER. In step 412, indications are displayed on the appropriate time line of higher-level messages that contain control information. In step 412, indications are displayed on the appropriate time line of higher-level messages that contain data. As illustrated in FIG. 3, each category is provided with a discrete time line, however this need not be the case. For example, a single time line could be used with control and data SDUs being illustrated with varying colors.

In the case of lower level messages, the methods proceeds to step 416 wherein the various interfaces are monitored for the presence of lower level messages. In general, the term lower level messages will refer to a specified level, for example, messages received by an MAC. The monitoring may be performed by hardware or software and may comprise, for example, AGILENT'S SIGNAL ANALYZER. In step 418, indications are displayed on the appropriate time line of lower level messages that contain control information. In step 420, indications are displayed on the appropriate time line of lower level messages that contain data. To reiterate, as illustrated in FIG. 3, each category is provided with a discrete time line, however this need not be the case. For example, a single time line could be used with control and data SDUs being illustrated with varying colors. In step 422, the various indications, for example the blocks illustrated in FIG. 3n, are optionally colored to indicate the content of PDUs represented. For example STATUS, ACK, POLL, and RETRANSMISSION PDUs may be highlighted with differing colors.

Although some embodiments of the present invention has been shown and described, it will be appreciated by those skilled in the art that changes may be made in these embodiments without departing from the principles and spirit of the invention, the scope of which is defined in the claims and their equivalents.

What is claimed is:

1. A method of displaying throughput of data across a protocol layer, the method comprising:
   for each of a plurality of transmission intervals, displaying a first graphical indication on a first time line of the number of data units received, by a protocol layer from a higher protocol layer; and
   displaying a second graphical indication on a second time line of the number of data units output by the protocol layer to a logical channel for each of a plurality of transmission intervals wherein the time covered by the first time line coincides with the time covered by the second time line.

2. A method, as set forth in claim 1, wherein the protocol layer is a radio link control layer.

3. A method, as set forth in claim 1, wherein the first graphical indication comprises a block for each transmission interval during which a data unit is received.

4. A method, as set forth in claim 1, wherein the second graphical indication comprises a block for each protocol data unit transmitted, wherein when more than one data unit is transmitted in a transmission interval, the blocks for each transmitted protocol data unit is stacked to indicate the transmission of multiple blocks.

5. A method, as set forth in claim 4, further comprising:
   displaying an indication of the maximum number of data units that may be transmitted during a transmission interval.

6. A method, as set forth in claim 4, further comprising:
   providing a distinguishing feature to displayed block based on a type of information contained in the data unit represent by said block.

7. A method, as set forth in claim 6, wherein the distinguishing feature comprises color.

8. A method, as set forth in claim 6, wherein blocks representing status PDUs, ACK, POLL, and RETRANSMISSION are provided with a distinguishing feature.

9. A method, as set forth in claim 1, further comprising:
   displaying a third graphical indication on a third time line of the number of data units received, by a protocol layer from a lower protocol layer, for each of a plurality of transmission intervals.

10. A method of displaying throughput of data across a protocol layer, the method comprising:
    displaying a first graphical indication of the number of data units received containing signaling information, by a protocol layer over a signaling channel, for each of a plurality of transmission intervals;
    displaying a second graphical indication of the number of data units containing signaling information output by the protocol layer over a signalling channel for each of a plurality of transmission intervals;
    displaying a third graphical indication of the number of data units received containing data, by a protocol layer over a data channel, for each of a plurality of transmission intervals; and
    displaying a fourth graphical indication of the number of data units containing data output by the protocol layer over a data channel for each of a plurality of transmission intervals.

11. A system for displaying throughput of data across a protocol layer, the system comprising:
    a probe that monitors communication in a UMTS system;
    an analyzer that monitors communication to and from a protocol layer in the UTRAN of the UMTS system; and
    a graphical user interface that displays a first graphical indication on a first time line of the number of data units received, by a protocol layer from a higher protocol layer, for each of a plurality of transmission intervals, and displays a second graphical indication on a second time line of the number of data units output by the protocol layer to a logical channel for each of a plurality of transmission intervals wherein the time covered by the first time line coincides with the time covered by the second time line.

* * * * *